United States Patent
Aichi

[11] Patent Number: 6,135,653
[45] Date of Patent: *Oct. 24, 2000

[54] DATA COMPRESSION METHOD AND APPARATUS AND DATA EXPANSION METHOD AND APPARATUS

[75] Inventor: Takao Aichi, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/559,253

[22] Filed: Nov. 15, 1995

Related U.S. Application Data

[63] Continuation of application No. 08/159,131, Nov. 30, 1993, abandoned.

[30] Foreign Application Priority Data

Nov. 30, 1992 [JP] Japan ................................ 4-320667

[51] Int. Cl.[7] .................................................. B41J 5/30
[52] U.S. Cl. ............................................ 400/61; 400/76
[58] Field of Search .............................. 382/245; 400/61, 400/76; 395/114

[56] References Cited

U.S. PATENT DOCUMENTS

| | | | |
|---|---|---|---|
| 4,646,356 | 2/1987 | Anderson et al. | 382/56 |
| 4,831,657 | 5/1989 | Casey et al. | 382/89 |
| 4,903,312 | 2/1990 | Sato | 382/21 |
| 5,020,121 | 5/1991 | Rosenberg | 382/56 |
| 5,058,187 | 10/1991 | Kim | 382/56 |
| 5,274,719 | 12/1993 | Taniguchi et al. | 382/56 |
| 5,319,463 | 6/1994 | Hongu | 358/261.1 |
| 5,327,254 | 7/1994 | Daher | 358/261.01 |
| 5,355,232 | 10/1994 | Katoaka | 358/261.1 |
| 5,537,616 | 7/1996 | Higuchi | 382/239 |
| 5,751,860 | 5/1998 | Su et al. | 382/244 |

FOREIGN PATENT DOCUMENTS

| | | | |
|---|---|---|---|
| 0434005 | 6/1991 | European Pat. Off. | 358/261.1 |
| 0448725 | 10/1991 | European Pat. Off. | 358/261.1 |
| 0503903 | 9/1992 | European Pat. Off. | 358/261.1 |
| 56-24393 | 3/1981 | Japan . | |
| 141567 | 7/1985 | Japan | 400/61 |
| 62-239771 | 10/1987 | Japan . | |
| 64-47173 | 2/1989 | Japan . | |

OTHER PUBLICATIONS

IBM Technical Disclosure Bulletin vol. 25 No. 10 Mar. 1983 (2 pages).

IBM Technical Disclosure Bulletin, vol. 23, No. 12, May 1981, New York US pp. 5468–5470, P.R. Spivey 'Hybrid data compression technique for change block skipping in an APA printer'.

*Primary Examiner*—John S. Hilten
*Assistant Examiner*—Charles H. Nolan, Jr.
*Attorney, Agent, or Firm*—Fitzpatrick Cella Harper & Scinto

[57] ABSTRACT

A predictive function expressed by a dot matrix is applied to binary image data and an object dot is converted into, e.g., white data so as to increase the number of white data. A run length coding is performed on the image data where the number of the white data is increased, thus compression is performed on the image data at high compression rate. When expanded, the compressed image data is expanded by run length decoding. A reverse prediction is performed by using the predictive function, thus, original image data is obtained.

36 Claims, 13 Drawing Sheets

FIG. 4

| WHITE DATA | | BLACK DATA | |
|---|---|---|---|
| RUN LENGTH | FREQUENCY | RUN LENGTH | FREQUENCY |
| 1 | 46670 | 1 | 71537 |
| 2 | 81705 | 2 | 571663 |
| 3 | 141188 | 3 | 132504 |
| 4 | 143336 | 4 | 145747 |
| 5 | 117828 | 5 | 72625 |
| 6 | 102552 | 6 | 45440 |
| 7 | 78085 | 7 | 27328 |
| 8 | 60948 | 8 | 20128 |
| 9 | 53623 | 9 | 14742 |
| 10 | 47036 | 10 | 12387 |
| ∼ | | ∼ | |
| 1961 | 1 | 1296 | 2 |
| 2016 | 2 | 1440 | 4 |
| 2160 | 2 | 1536 | 2 |
| 2304 | 491 | 1728 | 6 |

AVERAGE WHITE RUN LENGTH ≥ 12.60   AVERAGE BLACK RUN LENGTH ≥ 5.83

(NUMBER OF WHITE DATA ≥ 829)   (NUMBER OF BLACK DATA ≥ 111)

ENTROPY ≥ 4.64   ENTROPY ≥ 3.18

ENTROPY Hpel PER PIXEL ≥ 0.4238

| OBJECT DOT | NEIGHBORING DOT | PROBABILITY |
|---|---|---|
| ○ → | ○ | 95% |
| ○ → | ● | 3% |
| ● → | ○ | 10% |
| ● → | ● | 85% |

FIG. 7A
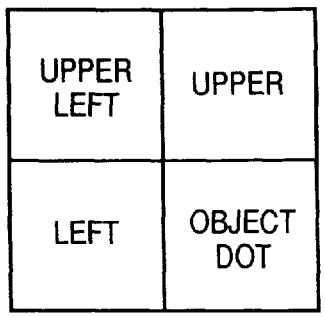
FIG. 7B
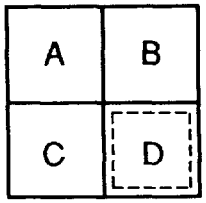
FUNC (A,B,C)
= ($\overline{A}$ & B) OR ($\overline{A}$ & C) OR (B & C)
FIG. 7C   FIG. 7D   FIG. 7E   FIG. 7F
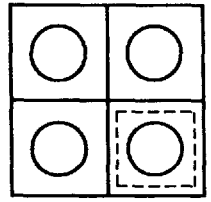 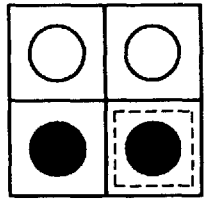 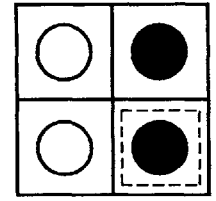 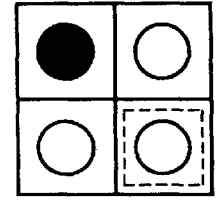
FIG. 7G   FIG. 7H   FIG. 7I   FIG. 7J
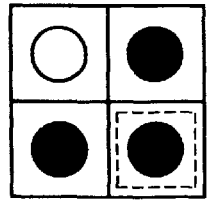 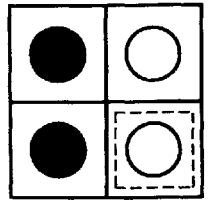 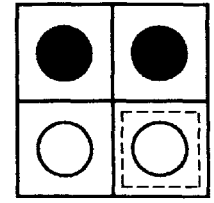 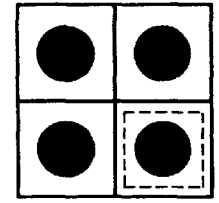
(8 COMBINATIONS WHERE PROBABILITY IS OVER 50%)

FIG. 10

| MSB ... LSB | DATA EXPRESSION CAPABLE RANGE |
|---|---:|
| xxx1 | 1~8(3) |
| xxx10 | 9~16(3) |
| xxxx100 | 17~32(4) |
| xxxx1000 | 33~48(4) |
| xxxx10000 | 49~64(5) |
| xxxxx100000 | 65~96(5) |
| xxxxx1000000 | 97~128(5) |
| xxxxx10000000 | 129~160(5) |
| xxxxxx100000000 | 161~224(6) |
| xxxxxx1000000000 | 225~288(6) |
| xxxxxx10000000000 | 289~352(6) |
| xxxxxxx100000000000 | 353~480(7) |
| xxxxxxx1000000000000 | 481~608(7) |
| xxxxxxx10000000000000 | 609~736(7) |
| xxxxxxxx100000000000000 | 737~992(8) |
| xxxxxxxx1000000000000000 | 993~1248(8) |
| xxxxxxxx10000000000000000 | 1249~1504(8) |
| xxxxxxxx100000000000000000 | 1505~1760(8) |
| xxxxxxxx1000000000000000000 | 1761~2016(8) |
| xxxxxxxx10000000000000000000 | 2017~2272(8) |
| xxxxxxxx100000000000000000000 | 2273~2528(8) |

DATA PORTION    OPERAND PORTION    VALUE IN PARENTHESES IS THE NUMBER OF BITS IN DATA PORTION

FIG. 12

RUN LENGTH DATA OF SAMPLE FONT DATA GROUP
AFTER PREDICTIVE FUNCTION PROCESSING
(APPROX. 8000 CHARACTERS OF KANJI FONT AND ALPHAMERIC FONT)

| WHITE DATA | | BLACK DATA | |
|---|---|---|---|
| RUN LENGTH | FREQUENCY | RUN LENGTH | FREQUENCY |
| 1 | 167523 | 1 | 779248 |
| 2 | 98479 | 2 | 303440 |
| 3 | 77458 | 3 | 21978 |
| 4 | 62670 | 4 | 9140 |
| 5 | 55070 | 5 | 329 |
| 6 | 46552 | 6 | 78 |
| 7 | 39965 | 7 | 7 |
| 8 | 35287 | 8 | 2 |
| 9 | 31847 | | |
| 10 | 29783 | | |
| ~ | | | |
| 2279 | 1 | | |
| 2280 | 1 | | |
| 2301 | 1 | | |
| 2304 | 491 | | |

AVERAGE WHITE RUN LENGTH ≥ 19.38      AVERAGE BLACK RUN LENGTH ≥ 1.33

(NUMBER OF WHITE DATA ≥ 1046)      (NUMBER OF BLACK DATA ≥ 9)

ENTROPY ≥ 5.23      ENTROPY ≥ 1.11

ENTROPY Hpel PER PIXEL ≥ 0.3064

DATA COMPRESSION METHOD AND APPARATUS AND DATA EXPANSION METHOD AND APPARATUS

This application is a continuation of application Ser. No. 08/159,131 filed Nov. 30, 1993 now abandoned.

BACKGROUND OF THE INVENTION

The present invention relates to a data compression/expansion method and apparatus which compresses or expands binary image data such as font data, and to a printing apparatus.

Conventional printing apparatuses and word processors store image data such as font data in an internal ROM. When a character code is inputted and an output of the character to a recording medium or a screen is instructed, font data corresponding to the character code is read out in accordance with the instruction. The font data is developed on a bit map, and an image is formed. In a printer such as an ink-jet recording device or a laser beam printer which can perform recording at high resolution, a large amount of image data is required to print a predetermined area, and higher resolution is also required for the font data. Thus, as the resolution increases, the number of dots forming a single character increases, resulting in the amount increase of the whole font data.

FIG. 2 is a diagram showing the font data of an alphabetical character "B" formed on 48×48 matrix as an example. In such font data, 288 bytes (2304 bits) is required for a character. In the case of Japanese writing system having approximately 7,000 characters for a single font, approximately 2M bytes is required for a memory capacity to store all the character font. This results in cost increase.

To solve the above problem, it is considered to compress the character font. As a method of compressing binary font data, run length method is well-known. The font data can be also compressed by MH coding or MMR coding which is used for a system performing an image transfer such as a facsimile.

A font data compression method is described with reference to FIG. 3.

In FIG. 3, the font data comprised of 20×20 dot matrix is shown. The black portion 301 is the data portion to be printed or displayed. In case of this font data, since 90% of the data is composed of white data, the frequency of continuously appearing white data is rather high. In fact, columns 1–7 and 16–20 are all white data in FIG. 3. When there is black data in a column, a header 302 provided in one bit basis for each column is marked. On the other hand, when there is no black data in a column, the header 302 is not marked. Thus, the font data excluding the white data columns can be stored by providing the header 302 and referring the presence of black data. Alternatively, it is possible to determine the presence of a black dot by the header 302 provided in a word unit or a byte unit.

In general, coding by run length is performed in accordance with run length of black and white data. However, it is required to analyze the data to determine what code allocation is appropriate prior to the coding (in fact, the MH coding method is an international standard of the coding to efficiently compress data when a run length coding is allotted to the image data of a standard original). To obtain an average information amount in a group of run length, it is appropriate to obtain the entropy of the image information of the data group. For example, if the probability where a run length is k is $P_k$, the entropy as an information source of a single run length can be expressed as follows:

$$H_{run} = \sum_{k=1}^{L} P_k \log_2(1/P_k) = -\sum P_k \log_2 P_k \quad (1)$$

wherein "L" is the number of groups of run length.

The equation (1) indicates a theoretical limitation of the average number of bits which is required for a binary expression of a single run length. Since the actual number of bits is an integral number, it would be large than $H_{run}$.

FIG. 4 is a chart showing an example where the frequency of appearance of white run and black run in approximately 8000 character patterns. The chart particularly shows the run lengths of white data and black data of the font data whose maximum run length is 48×48 bits (2304 bits), the frequency of appearance of each run length, and an average run length. From the data, the entropy of black data $H_{black}$ is 3.18, while that of white data $H_{white}$ is 4.64. For example, when the average length 5.83 of black data is coded by the binary system, 3.18 bits is required from $H_{black}$. This means that a black dot can be expressed by 3.18/5.83 (bits). However, this is only the case for a black dot.

$$Hpel = \frac{(\text{black entropy} + \text{white entropy})}{(\text{white average length} + \text{black average length})} \quad (2)$$

This value is regarded as a theoretical compression rate. In this embodiment, $H_{pel}$ is 0.4238 and the data occupies 42.38% of the information amount of original image data. However, since a code is expressed in an integral number, and an identifier is needed for expressing black/white data, the actual value is larger than 0.4238. Thus, when the run length method is used, the font data can be reduced at the theoretical compression rate 42.38. However, when an error between an address table to refer the font data and the actual value is considered (since a decimal expression is impossible in the number of bits), the actual compression rate becomes approximately 45.0%. For example, when three character fonts (mincho-tai, gothic-tai, and mouhitsu-tai) of the Japanese writing system are internally stored in a printing system, without compressing it, approximately 8M bytes (48×48 bits per character) is required for a memory capacity. On the other hand, if the run length coding is performed on the data, only 8M×0.45=3.60M (bytes) is required. However, there still remains a problem in the cost.

In a case where the header indicating a presence of black data is added to the above-described font data shown in FIG. 3, the compression rate is approximately 84.0% when the header is added on column-by-column basis, 81.6% on word-by-word basis, and 76.5% on byte-by-byte basis. This is because, in the actual font data, the font data of white dots is less present, while the character font where black dots are scattered is much present.

SUMMARY OF THE INVENTION

Accordingly, it is an object of the present invention to provide a data compression method and apparatus capable of compressing image data by increasing a compression rate by applying a run length method.

It is another object of the present invention to provide a data expansion method and apparatus capable of expanding compressed image data.

It is another object of the present invention to provide a data compression method and apparatus capable of storing a large amount of image data in a small memory capacity.

It is still another object of the present invention to provide a data compression method and apparatus capable of increasing a compression rate of image data by increasing white data or black data portion in an image data, and then performing run length coding.

It is still another object of the present invention to provide a printing apparatus capable of reducing the amount of image data stored in a memory by compressing and storing input image data, expanding the compressed image data, and developing the data to a character pattern to print out.

It is still another object of the present invention to provide a printing apparatus capable of storing compressed character font data, and developing it to a character pattern to print out.

It is still another object of the present invention to provide a printing apparatus capable of storing a large amount of font data in a small memory capacity by storing character font data at high compression rate as font data, and expanding the character font to print out.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

FIG. 4 is a chart of the frequency of appearance of black run and white run in approximately 8000 character patterns in a single font;

FIGS. 7A–7J are diagrams to explain the method of converting an object dot to white data when the probability is over 50% (pattern of high frequency) with considering the combination of an object dot and a left dot, an upper dot, and left upper dot of the object dot;

FIG. 10 is a chart showing an example of determining a run length based on Wyle coding and the length of operand and encoded data.

FIG. 12 is a chart showing the result when the theoretical compression rate is obtained with respect to the image data after the predictive function processing;

DESCRIPTION OF THE PREFERRED EMBODIMENTS

Preferred embodiments of the present invention will now be described in detail in accordance with the accompanying drawings. The present invention can be applied to a system constituted by a plurality of devices, or to an apparatus comprising a single device. Furthermore, the invention is applicable also to a case where the object of the invention is attained by supplying a program to a system or apparatus.

The present embodiment is described below. To further decrease the theoretical compression rate $H_{pel}$ in the equation (2), the denominator can be increased. Accordingly, when the frequency of continuous appearance of white dot or black dot is increased, the average length increases and the denominator also increases. In case of font data, since white dot occupies 90% of a character image, the ratio of the white dot can be increased. Since if the average length of the white dot increases, the entropy decreases along with the increase, the denominator of $H_{pel}$ increases, whereas the numerator decreases, thus the compression rate is improved. In this embodiment, a black data portion is reduced with respect to the original image data, and the run length coding is performed on the data in which the number of the black dots is decreased. Accordingly, the data compression rate can be improved.

If a type of font data is of interest, when a two-dimensional coding is performed on n dots, combinations can be $2^{n+1}$. This relationship is referred to as n-ply Markov information source. Since this is not a realistic situation, the neighboring dots with respect to a single dot are also considered. In case of the font data in particular, since a changing point from a black dot to a white dot and verse visa is few, the white dot portion can be increased by expressing the changing point in a black dot. Accordingly, data useful for the run length compression can be formed by increasing the number of white dots.

Figures 5, 6:
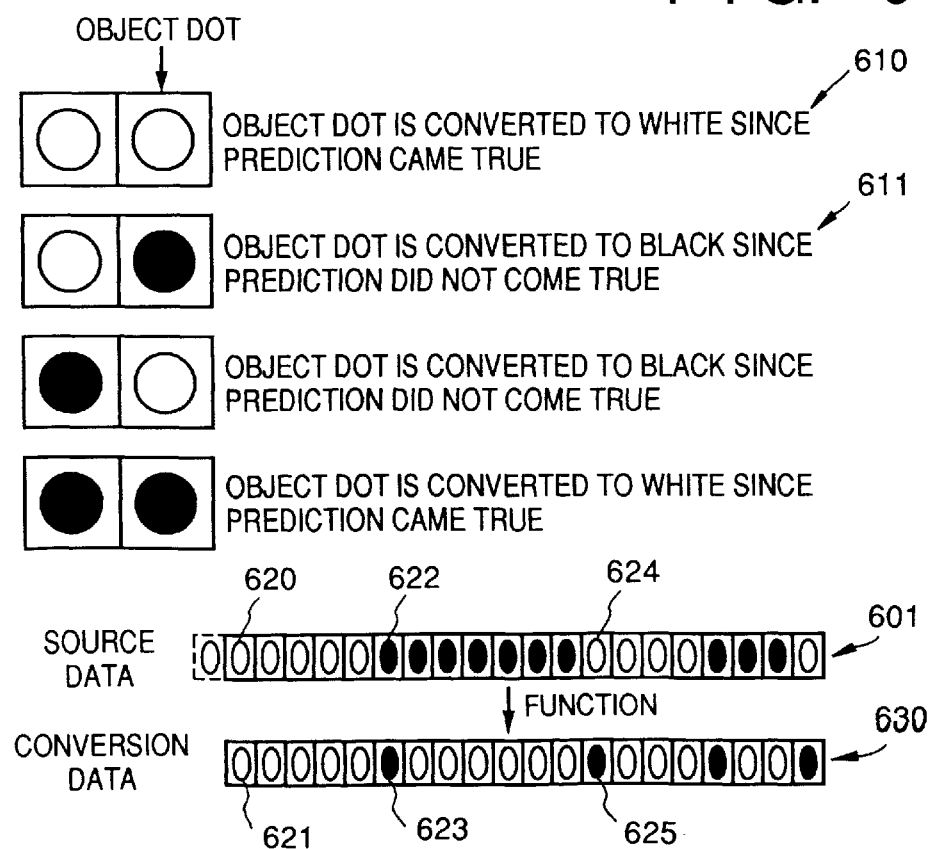
FIG. 5 is a diagram showing the transition probability from an object dot to a neighboring dot.
FIG. 6 is a diagram for describing the method of converting the original font data with reference to the conversion sample in one field Markov.

For example, the correlation of neighboring dots with respect to a single dot is considered. FIG. 5 is a conceptual diagram illustrating an example of transition probability from an object dot to a neighboring dot. As shown in FIG. 5, the transition probability from white to white (95%) and the probability from black to black (85%) are extremely high, whereas the transition probability from white to black (3%) and the transition probability from black to white (10%) are low. Accordingly, a value (in a binary system) of the neighboring dot with respect to a single dot can be predicted by the probability.

With reference to FIG. 6, the method of converting original font data with reference to the one field Markov is described.

As shown in FIG. 6, each dot of the source data (original data) 601 is sequentially scanned from the left to the right. It is assumed that the data outside of the left most data is white data. Accordingly, the transition to the left most dot 620 is white to white. This combination is the same as that indicated by numeral 610. Since the transition probability from white to white is high (95%), the left most dot 620 is converted to white data and the result is indicated by numeral 621. Next, since the adjacent dot is white and the transition probability is high, the adjacent dot is converted to white.

When a black dot 622 appears in the source data 601, the transition from white to black occurs. Since the probability of this transition is low (3%), the data is first converted to black data (623). The transition of the source data following the dot 622 is continuously black to black. Since the probability of this transition is high, each dot of the source data is converted to white data. When a white data 624 is detected, the transition from black to white occurs. Since the probability of this transition is low (10%), the dot 624 is converted to a black dot 625. The source data 601 is converted to the conversion data 630 by repeating the above processing. Thus, the black dot portion is reduced.

However, if a neighboring dot in the horizontal direction with respect to a signal dot is of interest, the correlation is effective only in the scanning direction, whereas the correlation in the vertical direction is not effective. The method considering the correlation in the vertical direction is shown in FIG. 7A. According to this method, the combinations of an object dot and the left dot, upper dot, and upper left dot are considered respectively, and when the probability where the object dot appears in actual image data is over 50%, the object dot is converted to white data. The combination of four dots is 16 patterns. Each of the probability of the eight patterns shown in FIGS. 7C–7J out of the 16 patterns is over 50% (pattern of high frequency) (this combination can be variable in accordance with the kind of an object image data). In a dot matrix expressed by A, B, C and D in FIG. 7B, if the case where the object dot D becomes black (=1) is expressed:

$$\text{Func}(A, B, C, D) = (/A\&B) \text{ or } (/A\&C) \text{ or } (B\&C) \quad (3)$$

wherein "/A" indicates "not A" and "&" indicates a logical product (Logical AND).

Figure 8:
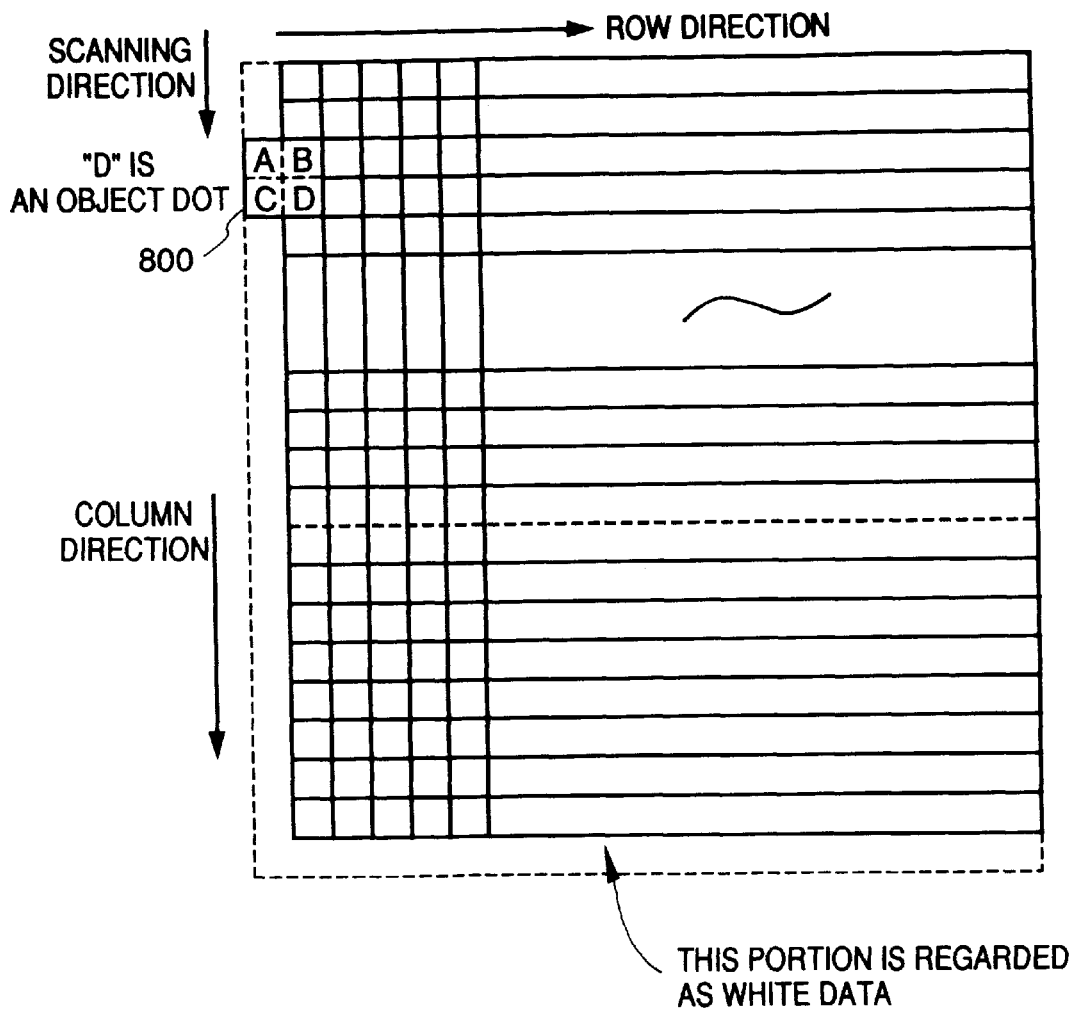
FIG. 8 is a diagram to explain the processing method such that subject image data is applied by a predictive function in each bit.

The equation (3) is referred to as a "predictive function". As shown in FIG. 8, with this predictive function, the dot matrix 800 is applied to each bit of the image data. It should be noted that a portion indicated by "D" of the dot matrix 800 is an object dot, and the font data is scanned vertically (in the column direction) in this embodiment, however, it can be scanned horizontally (in the row direction).

Figure 9A:
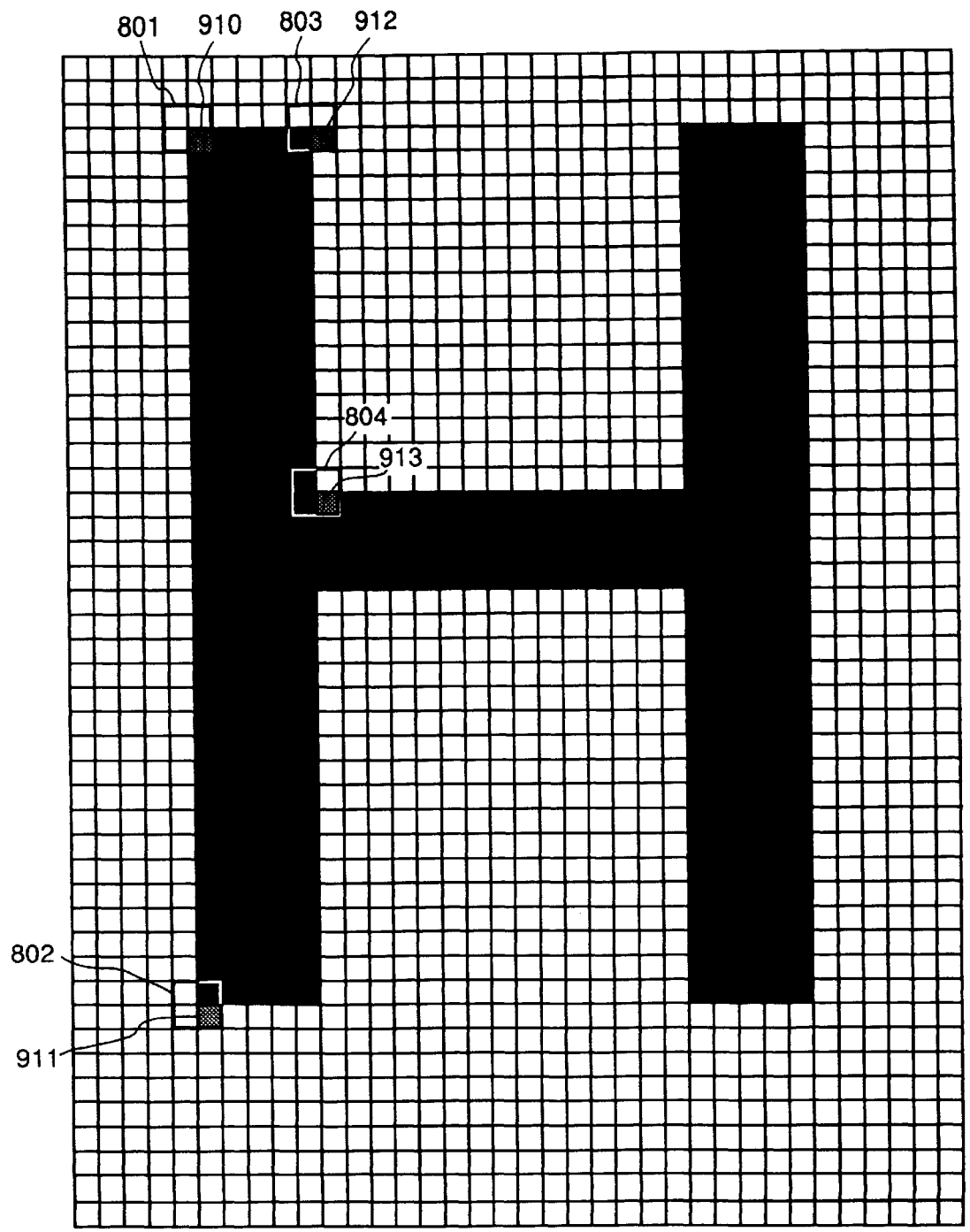
FIG. 9A is a diagram illustrating an example of character pattern data of a character "H" of 36×48 dots.

FIG. 9A is a diagram illustrating the case where the font data of a character "H" of 36×48 dots is processed by using the predictive function.

In FIG. 9A, when the dot matrix 800 is moved to the position indicated by numeral 801, since the patterns of black and white does not coincide with any patterns in FIGS. 7C–7J, the object dot 910 becomes black. When the dot matrix 800 is subsequently moved in the column direction, the pattern is coincided with FIG. 7E. Accordingly, each of the following dots becomes white, that is, "0". When the dot matrix 800 is moved to the position indicated by numeral 911 in FIG. 9A, the pattern does not coincide with any patterns in FIGS. 7C–7J where only the upper right dot becomes black. Thus, the dot 911 becomes black. Furthermore, when the dot matrix 800 is moved to the position 803 of FIG. 9A, the pattern is not coincided with any of patterns in FIGS. 7C–7J where only the lower left dot becomes black. Thus, the dot 912 becomes black. Since the patterns of each object dot are respectively coincided with the pattern of FIG. 7H until the position indicated by numeral 804, the object dots become all white. In the position 804, since only upper right dot becomes black, the object dot 913 becomes black. In this way, the character pattern of FIG. 9A is converted based on the predictive function and the result is shown in FIG. 9B.

Figure 9B:
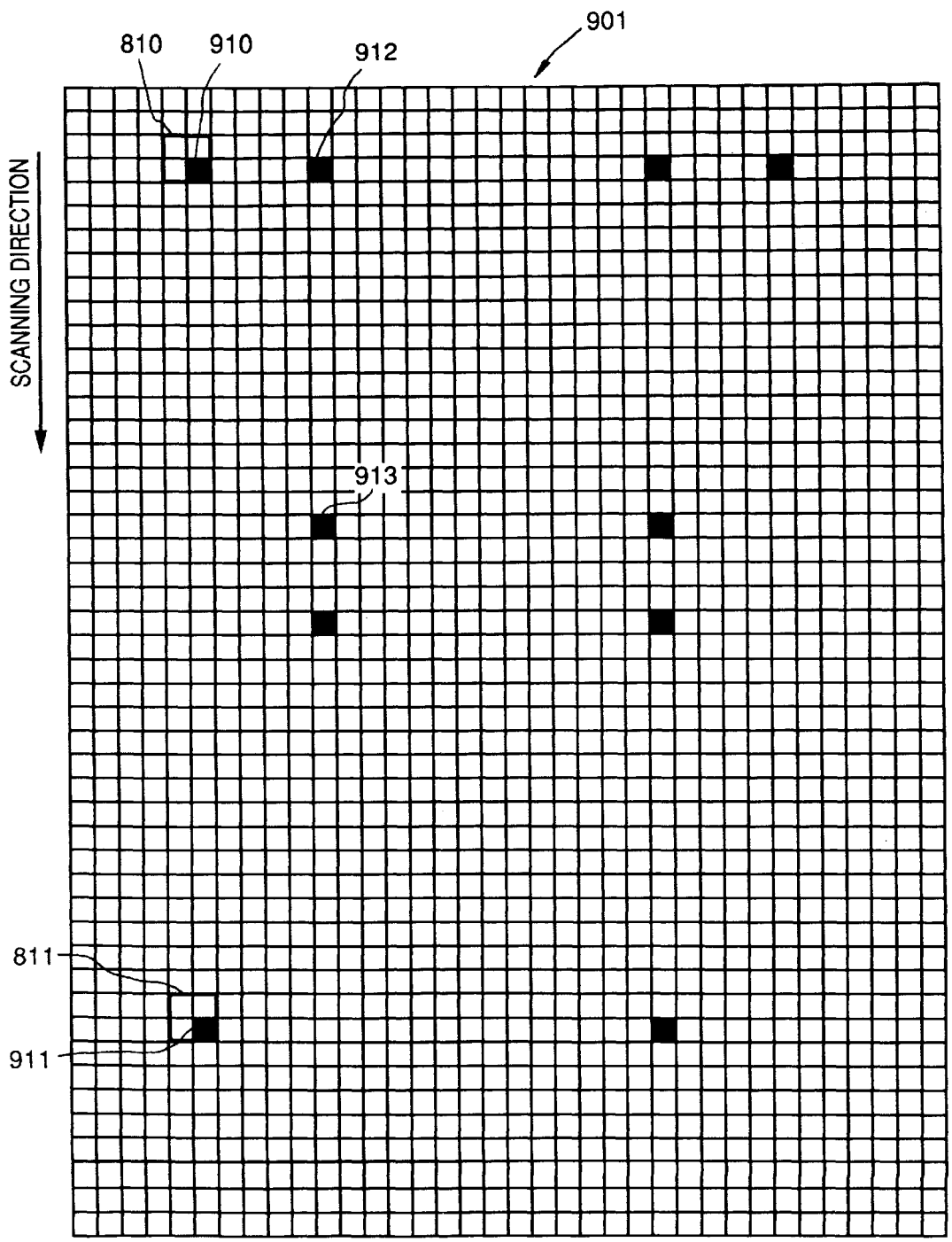
FIG. 9B is a diagram illustrating an example where the pattern data of FIG. 9A is processed by using the predictive function.

As apparent from FIG. 9B, in the matrix data 901 where the predictive function is applied, the number of black dots is reduced. In the case where the run length coding is applied after the number of black dots becomes very few, if the run length coding is performed on the black data, the amount of information increases. Therefore, the run length coding is performed on white data by applying the modified Wyle coding.

In order to code white data, as shown in FIG. 10, a run length code and the run length of a operand portion and data portion are determined based on the Wyle coding. That is, a code length of the group of data whose frequency of being white data is high is reduced, whereas the frequency is low is made longer, thus increasing the compression efficiency. Furthermore, in the black data coding, the number of black data groups is expressed in a form of operand used in the white data coding. That is, the number of continuation of black data is expressed by the number of "0". Since the black data and white data appear alternatively, a special identifier is not required. However, at the head of a single data group (e.g. a single font), one-bit identifier is provided.

Figure 11:
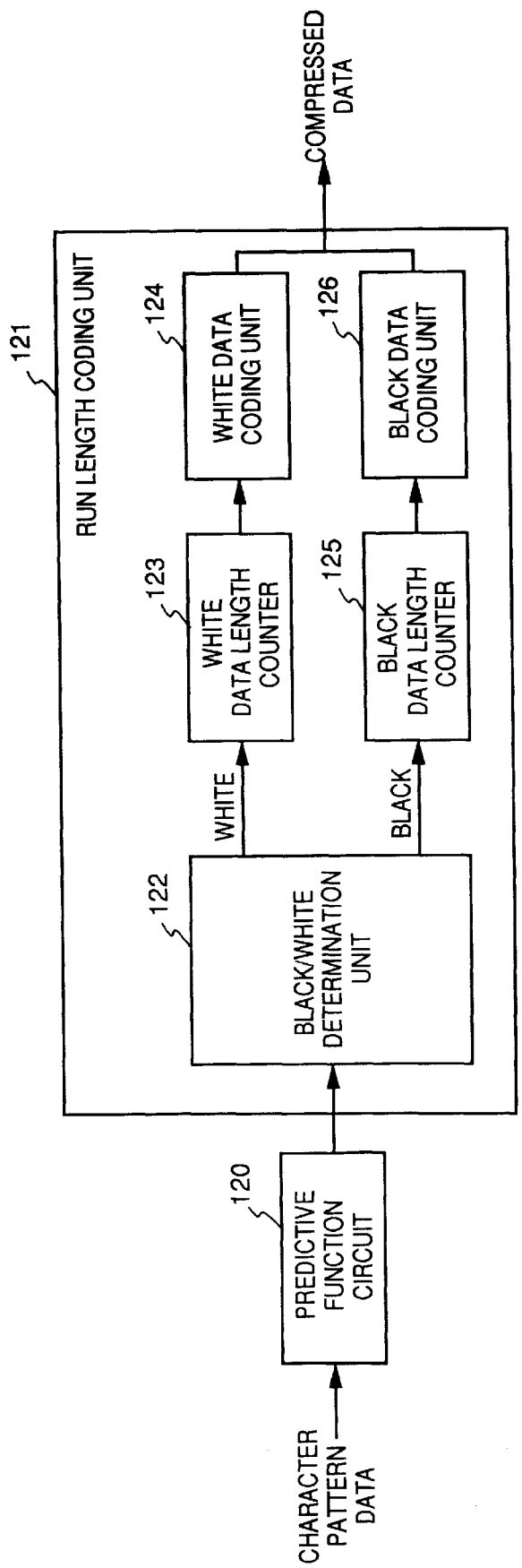
FIG. 11 is a block diagram illustrating the compression circuit of the font data in the embodiment.

FIG. 11 is a block diagram illustrating the construction of the coding circuit which performs coding of the embodiment. This coding circuit can be independently used or it can be mounted in an ink-jet printer of FIG. 1 (to be described later) to code image data and character pattern data transmitted from an external unit (data transmitter 106) and store in RAM 102.

In FIG. 11, numeral 120 is a predictive function circuit which forms matrix data, shown in FIG. 9B, where the number of white dots of the character pattern data is increased. Numeral 121 is a run length coding circuit which further encodes the data processed in the predictive function circuit 120. Numeral 122 is a black/white determination unit which determines if dot data is black or white. The black/white determination unit 122 outputs white data to a white data length counter 123, whereas black data to a black data length counter 125. The determination unit 122 further determines where the leading edge of the font data is black or white, and adds an identifier in accordance with the determination. Numeral 124 is a white data coding unit which forms coding data composed of a data portion and an operand portion as shown in FIG. 10 in accordance with the white data length counted by a white data length counter 123. Similarly, numeral 126 is a black data coding unit in which the number of continuation of black data is expressed by the number of series of "0" in accordance with the black data length counted by a black data length counter 125.

For example, in the example of FIG. 9B, when the coding is performed in the scanning direction of FIG. 8, since the white data is continued for 243 dots, it is coded as "0010101000000000", and the next black data (dot 910) is coded to as "1". Then, since the white data is continued for 35 dots, it is coded to as "00101000", and the next black data (dot 911) is to as "1". Subsequently, the white data continued for 203 dots is expressed as "1000001000000000". Then, the dot 912 is coded to as "1". Similarly, the coding is performed and the pattern of FIG. 9B is subject to the run length coding.

In this embodiment, the number of the white data is increased, however, this does not impose a limitation upon the invention, for the number of black data can be increased. In this case, during the run length coding, the black data portion can be coded in the data portion and operand portion in the similar way to white data, and the white data is coded in the similar way to the above-described black data.

FIG. 12 is a chart showing the result where a logical compression rate is obtained with respect to the image data after the predictive function processing by using the above approach. It is known that the entropy per dot is decreased from 0.4238 to 0.3064. This means that the logical compression rate is improved from approximately 42.38% to 30.63%. Particularly, the maximum the black data length is "8" and the entropy is extremely decreased. As a result of an actual sample font, the compression rate (including the header portion and the like) becomes approximately 33.0%. Thus, the amount of the font data is reduced from 8M bytes to 2.65M bytes. Accordingly, the problem in the conventional approach is solved by combining the predictive function processing and the run length method, and the objective data compression rate can be attained.

Figure 1:
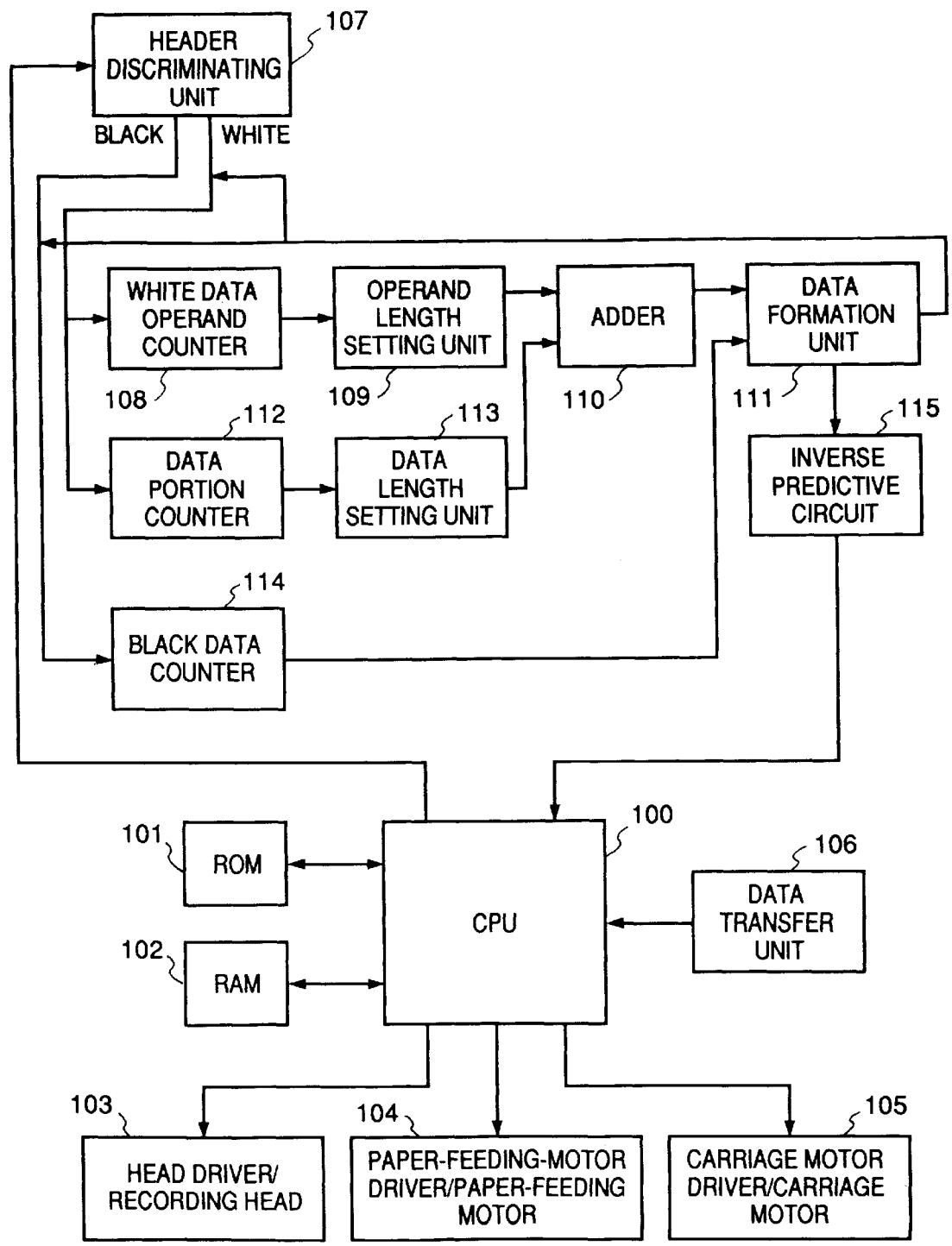
FIG. 1 is a block diagram illustrating the construction of the control circuit of an ink-jet printer as an example of the present invention.
Figure 2:
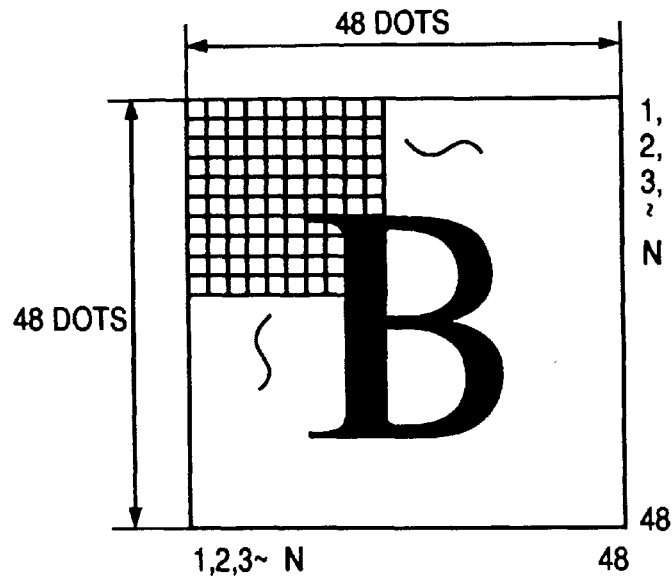
FIG. 2 is a diagram illustrating an example of the font data of an alphabetical character "B"
Figure 3:
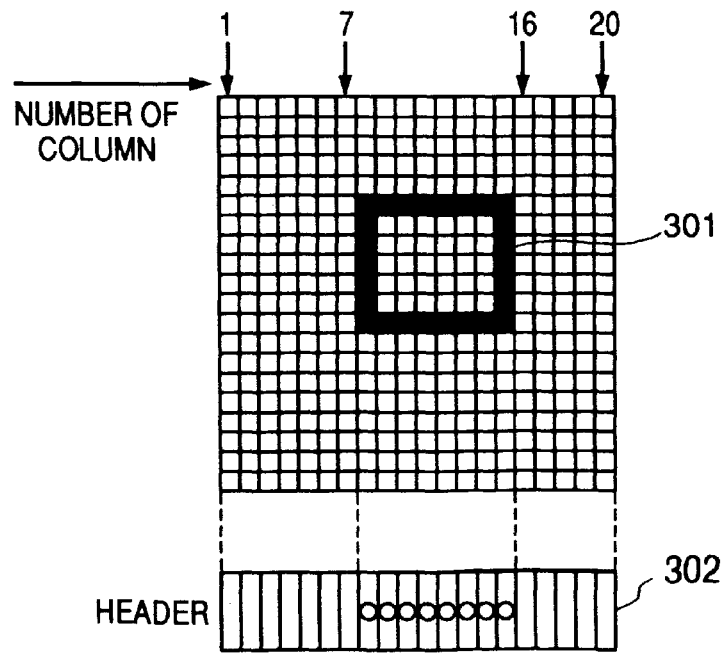
FIG. 3 is a diagram illustrating an example of the font data comprised of 20×20 dot matrix.

FIG. 1 is a block diagram mainly illustrating the construction of an ink-jet printer. As an apparatus accommodating the font data, a communication apparatus such as a display and facsimile apparatus, a work station, and various computers as well as the ink-jet printer of the present embodiment.

In FIG. 1, numeral 100 is a CPU which controls the operation of the printer and various processings. Numeral 101 is a ROM which stores the control programs executed by the CPU and various data such as compressed font data. Numeral 102 is a RAM having a work area used for various calculations during execution of the control processing by the CPU 100. Numeral 103 is a head driver and recording head which inputs a control signal supplied from the CPU 100 and performs recording on a recording medium in accordance with the signal. Numeral 104 is a paper-feeding-motor driver for transferring a recording medium and a paper-feeding motor. Numeral 105 is a carriage having a recording head and a carriage motor for scanning-driving the carriage.

Numerals 107–115 are data expansion circuits which form original font data by performing a reverse prediction by an inverse algorithm to the data formed by the prediction function after the run length data expansion is performed. The detailed operations of those circuits are described later.

The operation of the ink-jet printer of the embodiment is described.

As described earlier, after the predictive function processing, the font data is subject to the run length coding processing and the coded font data is stored in the ROM 101. In general, a printer and word processor store character data font such as kanji in mincho-tai, gothic-tai, and mouhitsu-tai or alphabetical font data. The data amount of the compressed font data is approximately 33% of the original amount 8M bytes, that is, approximately 2.64M bytes. Based on the character code in a form of various command states and data transferred from the data transfer unit 106, the font data stored in the ROM 101 is analyzed by the CPU 100 in accordance with the program similarly stored in the ROM 101. The analyzed font data is transferred to the data expansion circuits 107–115. Thus, the expansion processing in each font is executed. The processing is described below.

In the header discriminating unit 107, the above-described identifier discriminates whether the leading data of the font data is black data or white data. Since the black data and white data of the font data appear alternatively, the data is outputted to the black data counter 114 and the next data of the black data is outputted to the white data operand counter 108 and the data portion counter 112. If the leading bit is white data, the control is performed on the white data operand counter 108 and the data portion counter 112. The white data operand counter 108 counts the length of the white data operand portion shown in FIG. 10, and the operand length is determined in accordance with the value in the operand length setting unit 109. By the value of the operand portion, the range of the number of continuation of white data is determined so as to be 1–8 or 9–16 (bits). For example, with reference to FIG. 10, when the operand portion is "1000", the range of the number of continuation of white data is 38–48 (dots).

The data portion counter 112 performs the control on the data length setting unit 113 by obtaining a value of the data portion and sets the data length. As shown in FIG. 10, the data portion is set to be 3 to 8 bits. For example, when the value of the operand portion is "1000", the data portion is 4 bits. Since 16 combinations is possible by 4 bits (including "0000"), a value between "33" and "48" can be determined from the 4 bits and the data expression capable range determined by the operand portion. For example, when the operand portion is "1000" and the data portion is "0110", 33+"0110", that is, 33+6=39. From this expression, it can be known that the white data is continued for 39 dots. This adding processing is performed in the adder 110. Thus, the number of the white data dots is obtained. This is inputted into the data formation unit 111 and the white data is developed.

After the white data is developed, if the data processing for one block (e.g., a single font data) has not ended, it means that the next is black data and the black data is outputted to the black data counter 114. The coding data expresses the continuing white data for the number in which one is subtracted from the number of continuing white data, and the end of the continuing white data is marked by an appearance of black data. For example, when the black dots are continued for 4 dots, since it means that (4−1) black dots are continued after a black dot, it can be expressed by "0001".

The above processing is performed on one-block data and if it is judged that the block is the last block, since the font data whose white data is increased, as indicated by numeral 901 in FIG. 9B, is reproduced, the control is performed on the inverse predictive function circuit 115. Here, the data expressed by the run length development, that is, the data which is subject to the predictive function is converted via a reverse processing of the predictive function, that is, the inverse predictive function circuit 115, and original data (e.g., the pattern of FIG. 9A) which is the data before the compression processing can be obtained. By the above processing, the compressed image data (font data) inputted from the data transfer unit 106 can be expanded.

Taking an example of the operation of the inverse predictive function circuit 115 of FIG. 9B, when the dot matrix 810 comes to the position indicated by numeral 810, since the dot 910 is black, the object dot becomes black. When the dot matrix is moved for one dot in the scanning direction, the object dot position is "0", the data arrangement does not coincide with the pattern of FIG. 7E, and the following dots are converted to black. Similarly, the dot 910 through the dot before the dot 911 are converted to black. When the matrix comes to the position indicated by numeral 811, the object dot 911 is black, the data arrangement coincides with the pattern of FIG. 7E, and the object dot 911 is converted to a white dot. In this way, the pattern of FIG. 9B is converted to the pattern of FIG. 9A.

In the above embodiment, the image data expansion and compression processings are performed by using the dedicated circuit (e.g., gate alley) other than CPU. However, it can be arranged so that a software which executes data expansion and data coding is programmed and stored in the ROM 101 of FIG. 1, and data compression and data coding are performed by using this program.

For example, when the image development command is outputted from the data transfer unit 106, the CPU 101 interprets the program in the ROM 101, and expands and develops object image data to the RAM 102. Accordingly, the cost for constructing the dedicated circuit is cut sharply. Furthermore, in the inverse predictive function processing and the run length expansion processing, in the case of software processing, since it takes more time for the run length expansion processing on the average, only the run length expansion circuit can be provided.

Furthermore, it can be arranged that the run length expansion circuit and the inverse predictive function circuit are provided not in the ink-jet printer of the embodiment, but in a form of an external slot or an IC card, in accordance with the purpose of a user. For example, if a user uses font data such as alphabetical characters and numerals which do not require much time for a font expansion processing, the pattern development processing can be performed with the internal software without using the external slot or IC card.

Furthermore, either in an electric circuit or a software, an algorithm of a compression or predictive function is internally stored in a recording apparatus, and the image data inputted from outside (e.g., a host computer) is compressed, (expanded if needed,) converted, and printed or displayed on a screen. For example, as a page printer, in a control apparatus which develops image data for one page, the amount of information to be stored can be increased by compressing the input image data, and the merit of the cost down is increased.

Figure 13:
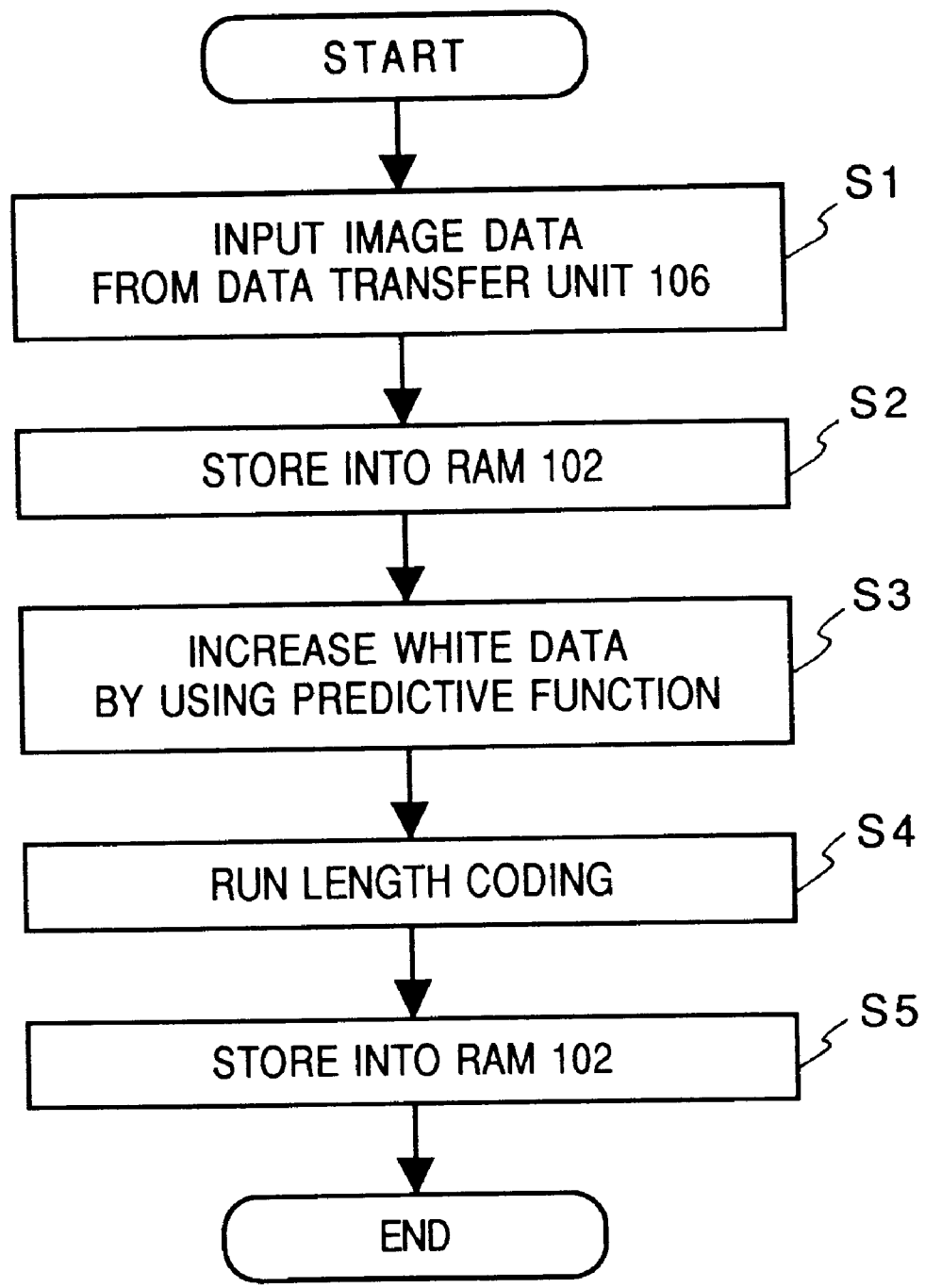
FIG. 13 is a flowchart illustrating the processing that image data is compressed and stored in the ink-jet printer.

FIG. 13 is a flowchart illustrating the processing to store the coded image data in the ink-jet printer of the embodiment. The control program which executes this processing is stored in the ROM 101.

At step S1, binary data transferred from the data transfer unit 106 is received, and stored in the RAM 102 at step S2. This image data can be character pattern data. At step S3, by using the above-described predictive function, this image data can be converted so that the number of the white data is increased, and the converted data is subject to the run length coding at step S4. The data compressed in this way is stored in the RAM 102. In the case where the image data is a character pattern, the character code inputted from the data transfer unit 106 is subject to the pattern development, the compressed data is referred and the character code is developed to a pattern.

Figure 14:
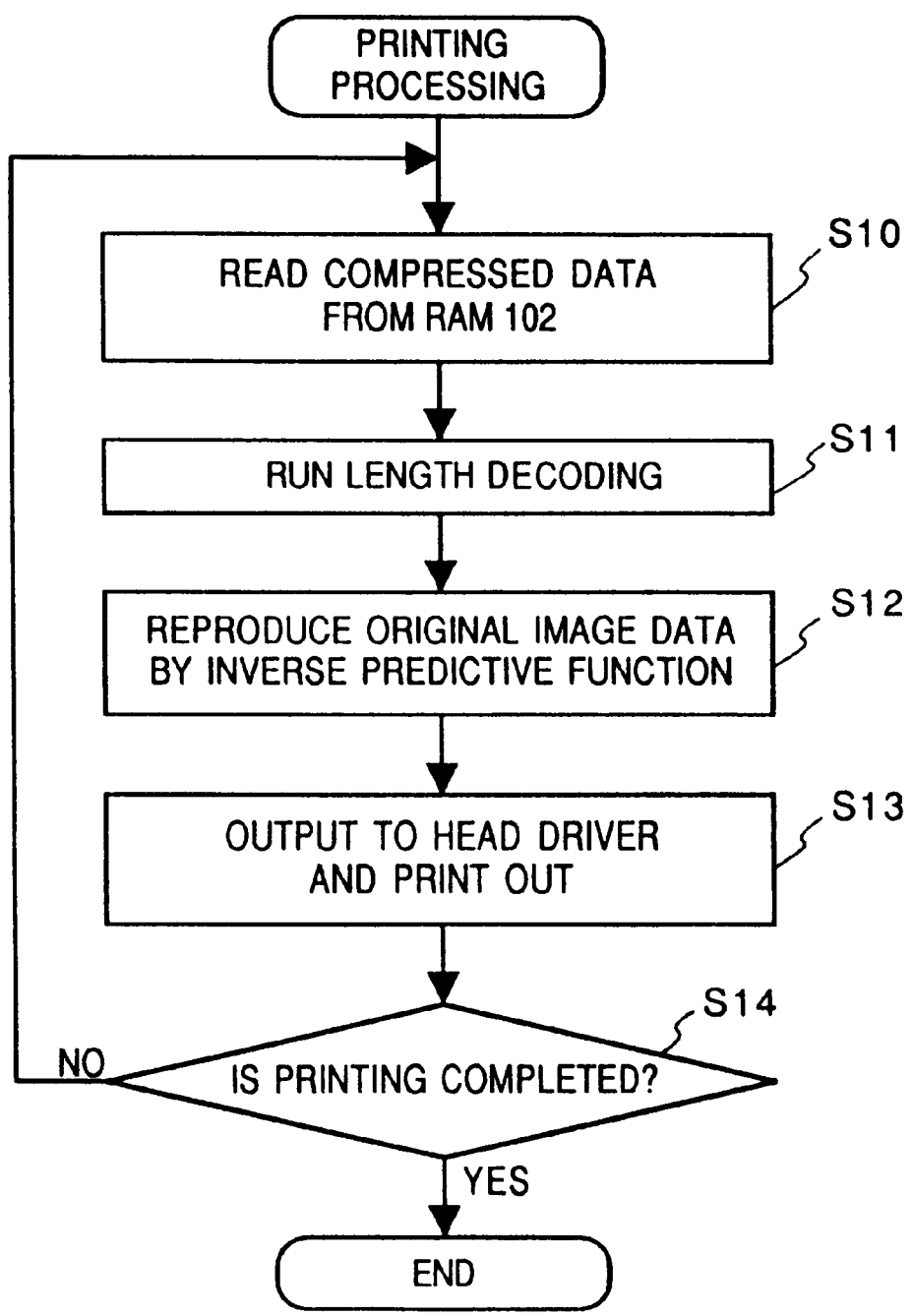
FIG. 14 is a flowchart illustrating the printing processing by decoding the compressed image data.

FIG. 14 is a flowchart illustrating the processing such that the compressed image data (a character pattern) stored in the RAM 102 is read out, expanded and printed. The control program which executes the processing is stored in the ROM 101.

When printing out the image data stored in the RAM 102 is instructed, the process proceeds to step S10 where the compressed image data is read out, and at step S11, the run length decoding is performed. At step S12, the decoded pattern data is reproduced to the original image data by using the inverse predictive function. In this way, the processing in steps S11 and S12 can be executed by the circuit shown in FIG. 1. Subsequently, the process proceeds to step S13 where the reproduced image data is outputted to the head driver/recording head 103 to print it out. Furthermore, when the character patterns are compressed and stored in the RAM 102, the compressed character pattern corresponding to a character code inputted from the data transfer unit 106 at step S10 is read out and decoded.

As described above, according to the present embodiment, the amount of font data is reduced and the cost of the apparatus including the font data can be cut sharply. Furthermore, the image data inputted from outside can be compressed by storing the compression algorithm internally, thus more image data can be stored.

The invention is particularly advantageous since the compression rate of the image data is increased by applying the run length method.

Furthermore, the image data compressed in the above-described way can be expanded.

As many apparently widely different embodiments of the present invention can be made without departing from the spirit and scope thereof, it is to be understood that the invention is not limited to the specific embodiments thereof except as defined in the appended claims.

What is claimed is:

1. A compressing apparatus for compressing pattern data, the pattern data including a first number of first dot data having a value "0" and a second number of second dot data having a value "1", said compressing apparatus comprising:

increasing means for increasing the first number of the first dot data in the pattern data to provide modified pattern data; and encoding means for counting, in the modified pattern data, a first counted value indicating a number of continuous first dot data so as to generate a first code having an operand indicating a range for the first counted value and a data portion indicating a relative value of the first counted value in the range, said encoding means further counting, in the modified pattern data, a second counted value indicating a number of continuous second dot data so as to generate a second code indicating the second counted value, said encoding means encoding the modified pattern data by alternatively using the first and second codes.

2. An apparatus according to claim 1, wherein said increasing means scans the pattern data and converts object dot to a first dot data having the value "0" if the object dot and peripheral dots of the object dot form an object pattern correspond to a high frequency pattern, said increasing means converting the object dot data to the second dot data having the value "1" if the object data does not correspond to a high frequency pattern.

3. An apparatus according to claim 1, wherein the second code includes a single "1" and a number of "0"s equal to one less than the number of continuous second dot date.

4. A compressing method for compressing pattern data, the pattern data including a first number of first dot data having a value "0" and a second number of second dot data having a value "1", said compressing method comprising the steps of:

increasing the first number of the first dot data in the pattern data to provide modified pattern data;

counting, in the modified pattern data, a first counted value indicating a number of continuous first dot data so as to generate a first code having an operand indicating a range for the first counted value and a data portion indicating a relative value of the first counted value in the range;

counting, in the modified pattern data, a second counted value indicating a number of continuous second dot data so as to generate a second code indicating the second counted value; and encoding the modified data by alternatively using the first and second codes.

5. A method according to claim 4, wherein said increasing step scans the pattern data and converts an object dot to a first dot data having the value "0" if the object dot and peripheral dots of the object dot form an object pattern correspond to a high frequency pattern, said increasing step converting the object dot to a second dot data having the value "1" if the object pattern does not correspond to a high frequency pattern.

6. A method according to claim 4, wherein the second code includes a single "1" and a number of "0"s equal to one less than the number of continuous second dot data.

7. An output apparatus comprising:

memory means for storing font data, the font data having been generated by compressing pattern data, the pattern data including a first number of first dot data having a value "0" and a second number of second dot data having a value "1", by increasing the first number of the first dot data in the pattern data to provide modified pattern data, counting, in a modified pattern data, a first counted value indicating a number of continuous first dot data so as to generate a first code having an operand indicating a range for the first counted value and a data portion indicating a relative value of the first counted value in the range, counting, in the modified pattern data, a second counted value indicating a number of continuous second dot data so as to generated a second code indicating the second counted value, and encoding the modified pattern data by alternatively using the first and second codes;

first expansion means for generating continuous first dot data having the value "0" determined by the range and relative values of the first codes stored in said memory means;

second expansion means for generating second dot data having the value "1" based on the second codes stored in said memory means;

developing means for developing character pattern data based on the first and second dot data respectively generated by said first and second expansion means; and output means for outputting characters based on the character pattern data.

8. An apparatus according to claim 7, wherein an operation of increasing the first dot data scans the pattern data and converts an object dot to a first dot data having the value "0" if the object dot and peripheral dots of the object dot form an object pattern correspond to a high frequency pattern, the operation converting the object dot to a second dot data having the value "1" if the object pattern does not correspond to a high frequency pattern.

9. An apparatus according to claim 7, wherein the second code includes a single "1" and a number of "0"s equal to one less than the number of continuous second dot date.

10. An apparatus according to claim 7, wherein said output means includes a printer.

11. An output method that uses memory means for storing font data, the font data having been generated by compressing pattern data, the pattern data including a first number of first dot data having a value "0" and a second number of second dot data having a value "1", by increasing the first number of the first dot data in the pattern data to provide modified pattern data, counting, in the modified pattern data, a first counted value indicating a number of continuous first dot data so as to generated a first code having an operand indicating a range for the first counted value and a data portion indicating a relative value of the first counted value in the range, counting, in the modified pattern data, a second counted value indicating a number of continuous second dot data so as to generate a second code indicating the second counted value, and encoding the modified pattern data by alternatively using the first and second codes, said method comprising:

a first expansion step of generating continuous first dot data having the value "0" determined by the range and relative values of the first codes stored in the memory means;

a second expansion step of generating second dot data having the value "1" based on the second codes stored in the memory means;

a developing step of developing character pattern data based on the first and second dot data respectively generated in said first and second expansion steps; and an output step of outputting characters based on the character pattern data.

12. A method according to claim 11, wherein an operation of increasing the first dot data scans the pattern data and converts an object dot to a first dot data having the value "00" if the object dot and peripheral dots of the object dot form an object pattern correspond to a high frequency pattern, the operation converting the object dot to a second dot data having the value "1" if the object pattern does not correspond to a high frequency pattern.

13. A method according to claim 11, wherein the second code includes a single "1" and a number of "0"s equal to one less than the number of continuous second dot data.

14. An expansion apparatus comprising:

memory means for storing font data, the font data having been generated by compressing pattern data, the pattern data including a first number of first dot data having a value "0" and a second number of second dot data having a value "1", by increasing the first number of the first dot data in the pattern data to provide modified pattern data, counting, in the modified pattern data, a first counted value indicating a number of continuous first dot data so as to generate a first code having an operand indicating a range for the first counted value and a data portion indicating a relative value of the first counted value in the range, counting, in the modified pattern data, a second counted value indicating a number of continuous second dot data so as to generate a second code indicating the second counted value, and encoding the modified pattern data by alternatively using the first and second codes;

first expansion means for generating continuous first dot data having the value "0" determined by the range and relative values of the first codes stored in said memory means;

second expansion means for generating second dot data having the value "1" based on the second codes stored in said memory means; and developing means for developing character pattern data based on the first and second dot data respectively generated by said first and second expansion means.

15. A apparatus according to claim 14, wherein an operation of increasing the first dot data scans the pattern data and converts an object dot to a first dot data having the value "00" if the object dot and peripheral dots of the object dot form an object pattern correspond to a high frequency pattern, the operation converting the object dot to a second dot data having the value "1" if the object pattern does not correspond to a high frequency pattern.

16. A apparatus according to claim 14, wherein the second code includes a single "1" and a number of "0"s equal to one less than the number of continuous second dot data.

17. An expansion method that uses memory means for storing font data, the font data having been generated by compressing pattern data, the pattern data including a first number of first dot data having a value "0" and a second number of second dot data having a value "1", by increasing the first number of the first dot data in the pattern data to provide modified pattern data, counting, in the modified pattern data, a first counted value indicating a number of continuous first dot data so as to generated a first code having an operand indicating a range for the first counted value and a data portion indicating a relative value of the first counted value in the range, counting, in the modified pattern data, a second counted value indicating a number of continuous second dot data so as to generate a second code indicating the second counted value, and encoding the modified pattern data by alternatively using the first and second codes, said method comprising:

a first expansion step of generating continuous first dot data having the value "0" determined by the range and relative values of the first codes stored in the memory means;

a second expansion step of generating second dot data having the value "1" based on the second codes stored in the memory means; and a developing step of developing character pattern data based on the first and second dot data respectively generated in said first and second expansion steps.

18. A method according to claim 17, wherein an operation of increasing the first dot data scans the pattern data and converts an object dot to a first dot data having the value "00" if the object dot and peripheral dots of the object dot form an object pattern correspond to a high frequency pattern, the operation converting the object dot to a second dot data having the value "1" if the object pattern does not correspond to a high frequency pattern.

19. A method according to claim 17, wherein the second code includes a single "1" and a number of "0"s equal to one less than the number of continuous second dot data.

20. A compressing apparatus of data, the data including a first number of first data having a value "0" and a second number of second data having a value "1", said compressing apparatus comprising:

increasing means for increasing the first number of the first data in the data to provide modified data; and encoding means for counting, in the modified data, a first counted value indicating the number of continuous first data so as to generate a first code having an operand indicating a range for the first counted value and a data portion indicating relative value of the first counted value in the range, said encoding means further counting, in the modified data, a second counted value indicating a number of continuous second data so as to generate a second code indicating the second counted value, said encoding means encoding the modified data by alternatively using the first and second codes.

21. An apparatus according to claim 20, wherein said increasing means scans the data and converts object data to the first data having the value "0" if the object data and peripheral data of the object data form an object pattern corresponding to a high frequency pattern, said increasing means converting the object data to the second data having the value "1" if the object data does not correspond to a high frequency pattern.

22. A apparatus according to claim 20, wherein the second code includes a single "1" and a number of "0"s equal to one less than the number of continuous second data.

23. A data apparatus according to claim 20, wherein the data includes character pattern data.

24. A compressing method for compressing data, the data including a first number of first data having a value "0" and a second number of second data having a value "1", said compressing method comprising the steps of:

increasing the first number of the first data in the data to provide modified data; and counting, in the modified data, a first counted value indicating the number of continuous first data so as to generate a first code having an operand indicating a range for the first counted value and a data portion indicating a relative value of the first counted value in the range;

counting, in the modified data, a second counted value indicating a number of continuous second data so as to generate a second code indicating the second counted value; and encoding the modified data by alternatively using the first and second codes.

25. An method according to claim 24, wherein said increasing steps scans the data and converts object data to the first data having the value "0" if the object data and peripheral data of the object data form an object pattern corresponding to a high frequency pattern, said increasing step converting the object data to second data having the value "1" if the object data does not correspond to a high frequency pattern.

26. A method according to claim 24, wherein said second code includes a single "1" and a number of "0"s equal to one less than the number of continuous second data.

27. A method according to claim 24, wherein the data includes character pattern data.

28. A data developing apparatus comprising:

memory means for storing data including a first number of first data having a value "0" and a second number of second data having a value "1", by increasing the first number of the first data in the data to provide modified data, counting, in the modified data, a first counted value indicating a number of continuous first data so as to generate a first code having an operand indicating a range for the first counted value and a data portion indicating a relative value of the first counted value in the range, counting, in the modified data, a second counted value indicating a number of continuous second data so as to generate a second code indicating the second counted value, and encoding the modified data by alternatively using the first and second codes;

first expansion means for generating continuous first data having the value "0" determined by the range and the relative values of the first codes stored in said memory means;

second expansion means for generating second data having the value "1" based on the second codes stored in said memory means; and developing means for developing data based on the first and second data respectively generated by said first and second expansion means.

29. An apparatus according to claim 28, wherein an operation of increasing the first data, scans the data and converts object data to the first data having the value "0" if the object data and peripheral data of the object data form an object pattern corresponding to a high frequency pattern, the operation converting the object data to the second data having the value "1" if the object data does not correspond to a high frequency pattern.

30. A method according to claim 28, wherein said second code includes a single "1" and a number of "0"s equal to one less than the number of continuous second data.

31. An apparatus according to claim 28, further comprising an ink jet printer for printing characters based on the pattern data.

32. An apparatus according to claim 28, wherein the data includes character pattern data.

33. A data developing method that uses memory means for storing data including a first number of first data having a value "0" and a second number of second data having a value "1", by increasing the first number of the first data in the data to provide modified data, counting, in the modified data, a first counted value indicating a number of continuous first data so as to generate a first code having an operand indicating a relative value of the first counted value in the range, counting, in the modified data, a second counted value indicating a number of continuous second data so as to generate a second code indicating the second counted value, and encoding the modified data by alternatively using the first and second codes;

first expansion step of generating continuous first data having the value "0" determined by the range and relative values of the first codes stored in the memory means;

a second expansion step of generating second data having the value "1" based on the second codes stored in the memory means; and a developing step of developing data based on the first and second data respectively generated by said first and second expansion steps.

34. An method according to claim 33, wherein an operation of increasing the first data, scans the data and converts object data to the first data having the value "0" if the object data and peripheral data of the object data form an object pattern corresponding to a high frequency pattern, the operation converting the object data to the second data having the value "1" if the object data does not correspond to a high frequency pattern.

35. A method according to claim 33, wherein said second code includes a single "1" and a number of "0"s equal to one less than the number of continuous second data.

36. A method according to claim 33, wherein the data includes character pattern data.

* * * * *

UNITED STATES PATENT AND TRADEMARK OFFICE
CERTIFICATE OF CORRECTION

PATENT NO. : 6,135,653
DATED : October 24, 2000
INVENTOR(S) : Takao Aichi

It is certified that error appears in the above-identified patent and that said Letters Patent is hereby corrected as shown below:

Title page,
Item [56], References Cited, Attorney, Agent or Firm, "Fitzpatrick Cella Harper & Scinto" should read -- Fitzpatrick, Cella, Harper & Scinto --.

Column 1,
Line 54, "referring" should read -- referring to --.

Column 2,
Line 24, should read -- ¶ If it is assumed that the entropy in a dot is $H_{pel}$: --;
Line 44, "is" should read -- are --;
Line 46, "is" should read -- are --.

Column 4,
Line 37, "verse visa" should read -- vice versa --;
Lines 59, 60 and 63, "left most" should read -- leftmost --.

Column 5,
Line 28, "if" should be deleted;
Line 46, "does" should read -- do --;
Line 66, "As" should read -- As is --.

Column 6,
Line 11, "the" should read -- that of a group whose --;
Line 35, "whereas" should read -- and --;
Line 52, "to" should be deleted;
Line 53, "to" should read -- coded --;
Line 55, "to" should be deleted.

Column 7,
Line 3, "the black" should read -- black --.

Column 8,
Line 67, "CPU 101" should read -- CPU 100 --.

Column 9,
Line 25, "merit of the cost" should read -- costs are reduced. --;
Line 26, "down is increased." should be deleted;
Line 41, "referred" should be deleted.

UNITED STATES PATENT AND TRADEMARK OFFICE
CERTIFICATE OF CORRECTION

PATENT NO.   : 6,135,653
DATED        : October 24, 2000
INVENTOR(S)  : Takao Aichi It is certified that error appears in the above-identified patent and that said Letters Patent is hereby corrected as shown below:

Column 10,
Line 32, "object" should read -- an object --;
Line 36, "dot data to the" should read -- dot to a --;
Line 41, "date." should read -- data. --;
Line 66, "correspond" should read -- corresponding --.

Column 11,
Line 48, "date." should read -- data. --;
Line 50, "a" should read -- an ink jet --;
Line 59, "generated" should read -- generate --.

Column 12,
Line 16, " "OO" " should read -- "0" --;
Line 17, "correspond" should read -- corresponding --;
Line 56, " "OO" " should read -- "0" --;
Line 57, "correspond" should read -- corresponding --.

Column 13,
Line 5, "generated" should read -- generate --;
Line 27, " "OO" " should read -- "0" --;
Line 28, "correspond" should read -- corresponding --;
Line 46, "relative" should read -- a relative --.

Column 14,
Line 60, "data" should read -- pattern --.

Column 16,
Line 16, "first" should read -- a first --.

Signed and Sealed this

Fifteenth Day of January, 2002

Attest:

Attesting Officer

JAMES E. ROGAN
Director of the United States Patent and Trademark Office